(12) United States Patent
Wolff et al.

(10) Patent No.: US 8,194,500 B2
(45) Date of Patent: Jun. 5, 2012

(54) METHOD AND DEVICE FOR LOCATING A SOUND SOURCE

(75) Inventors: Tobias Wolff, Neu-Ulm (DE); Markus Buck, Biberach (DE); Gerhard Schmidt, Ulm (DE); Olga González Valbuena, Carrion de los Condes (ES); Günther Wirsching, Eischstätt (DE)

(73) Assignee: Nuance Communications, Inc., Burlington, MA (US)

( * ) Notice: Subject to any disclaimer, the term of this patent is extended or adjusted under 35 U.S.C. 154(b) by 379 days.

(21) Appl. No.: 12/547,681

(22) Filed: Aug. 26, 2009

(65) Prior Publication Data

US 2010/0054085 A1    Mar. 4, 2010

(30) Foreign Application Priority Data

Aug. 26, 2008  (EP) ..................... 08015055

(51) Int. Cl.
  *G10L 21/02*  (2006.01)
  *G01S 3/80*   (2006.01)
  *H04R 3/00*   (2006.01)

(52) U.S. Cl. ....................... 367/125; 367/129

(58) Field of Classification Search ............... 367/125, 367/129
See application file for complete search history.

(56) References Cited

U.S. PATENT DOCUMENTS

| 5,778,082 | A | 7/1998 | Chu et al. ............... 381/92 |
| 6,914,854 | B1 | 7/2005 | Heberley et al. ......... 367/119 |
| 2002/0150263 | A1 | 10/2002 | Rajan .................. 381/92 |
| 2005/0203981 | A1 | 9/2005 | Sawada et al. ........... 708/322 |
| 2010/0054085 | A1 * | 3/2010 | Wolff et al. ............ 367/125 |

FOREIGN PATENT DOCUMENTS

| EP | 2063419 A1 * | 5/2009 |
| GB | 1 430 051 | 3/1976 |

OTHER PUBLICATIONS

Mizumachi, M., et al., "Noise Reduction Using Paired-Microphones on Non-Equally-Spaced Microphone Arrangement," *Eurospeech 2003—Geneva*, Sep. 1, 2003, pp. 585-588.
European Patent Office, European Search Report Application No. 08015055.0-2220; dated Apr. 7, 2009.

* cited by examiner

*Primary Examiner* — Daniel Pihulic
(74) *Attorney, Agent, or Firm* — Sunstein Kann Murphy & Timbers LLP

(57) ABSTRACT

A method of locating a sound source based on sound received at an array of microphones comprises the steps of determining a correlation function of signals provided by microphones of the array and establishing a direction in which the sound source is located based on at least one eigenvector of a matrix having matrix elements which are determined based on the correlation function. The correlation function has first and second frequency components associated with a first and second frequency band, respectively. The first frequency component is determined based on signals from microphones having a first distance, and the second frequency component is determined based on signals from microphones having a second distance different from the first distance.

33 Claims, 8 Drawing Sheets

METHOD AND DEVICE FOR LOCATING A SOUND SOURCE

PRIORITY

The present application claims priority from European Application No. 08015055.0 filed on Aug. 26, 2008 entitled Method and Device for Locating a Sound Source, which is incorporated herein by reference in its entirety.

TECHNICAL FIELD

This invention relates to a method and device for locating a sound source. In particular, this invention relates to a method and device that allow a direction in which a sound source is located, or plural directions in which plural sound sources are located, to be identified.

RELATED ART

An increasing number of electronic systems utilizes speech control. Examples for such systems include home applications, such as home entertainment systems, acoustic front-ends for speech dialogue systems or hands free telephony applications. In many such systems, it is useful or even required to establish the direction in which a sound source is located. For example, in noisy environments, beamforming techniques may be employed to achieve better noise suppression. When the directions in which sound sources that generate signals used for communication or control purposes are known, the beamforming may be adapted so as to have higher sensitivity in the direction in which a sound source is located.

A sound source may be located by spatially sampling a sound wave field. For example, a pair of microphones may be used to determine a phase difference of sound signals received at the microphones. The direction in which a sound source is located, or the directions in which several sound sources are located, may be derived from the phase difference, the known microphone distance, and the sound velocity.

When a single pair of microphones is used to detect a phase difference of microphone signal outputs, the phase difference will be small for low sound frequencies, i.e., when the sound wavelength is much larger than the microphone spacing. As small phase differences may be difficult to detect, in particular in noisy environments, the quality of phase difference estimates derived from low frequency sound signal components may be poor, at least when compared to phase difference estimates derived from high frequency sound signal components. This can lead to a reduced accuracy of the resulting direction estimates, and/or can have the effect that only a lower number of sound sources may be resolved simultaneously.

Therefore, there is a need in the art for improved methods and devices for locating a sound source. In particular, there is a need in the art for a method and device for locating a sound source, which is adapted to more readily detect phase differences associated with low frequency sound signal components, and which allows plural sound sources to be located.

According to this invention, this need is addressed by a method and device as defined in the independent claims. The dependent claims define preferred or advantageous embodiments.

SUMMARY OF THE INVENTION

According to one aspect of the present invention, a method of locating a sound source is provided. The method provides an estimate for a direction in which the sound source is located based on sound received at an array of microphones. In the method, at least one correlation function of signals provided by microphones of the array is determined. The direction in which the sound source is located is established based on at least one eigenvector of a matrix having matrix elements which are based on the correlation function. The correlation function has a plurality of frequency components associated with a plurality of frequency bands and including a first frequency component and a second frequency component. The first frequency component is determined based on signals from microphones having a first distance, and the second frequency component is determined based on signals from microphones having a second distance. The second distance is different from the first distance.

In this method, as the direction of the sound source is established based on one or several eigenvectors of the matrix which is generated based on the correlation function, the method may employ techniques similar to the ones known from a conventional "MUltiple SIgnal Classification" (MUSIC)-algorithm. In particular, a plurality of sound sources may be simultaneously located. As the distance of microphones that provide the signals from which a frequency component of the correlation function is determined varies as a function of frequency band, the method has higher versatility than the conventional frequency-domain MUSIC-algorithm. For example, the microphone distance may be selected as a function of frequency band such that phase differences may be more easily detected even for frequency bands having low frequencies, i.e., long wavelengths.

Each frequency component of the plurality of frequency components may be determined based on signals from one pair of microphones of the array. As the frequency components are respectively derived based on a pair of signals only, only moderate processing overhead is required.

In order to determine a frequency component associated with a given frequency band, the pair of microphones may be selected from the array to have a given distance which is a function of the given frequency band. The microphones may be selected according to a function specifying the distance between the microphones as a function of frequency band. The function may be such that the distance is a decreasing function of frequency band. However, the distance does not need to, and frequently will not, be a strictly decreasing function of frequency band, but may also be constant for a set of adjacent frequency bands. By selecting the microphone distance such that it is larger at lower frequencies, the phase difference between the signals received at the microphones is increased as compared to a smaller constant microphone distance.

First and second phase factors may be defined for the first and second frequency components, respectively, the first phase factor being a complex number having the phase of the first frequency component as an argument, and the second phase factor being a complex number having the phase of the second frequency component as an argument. At least one of the matrix elements may be a non-linear function of the first phase factor or a non-linear function of the second phase factor. In particular, at least one of the matrix elements may be a power of the first phase factor or a power of the second phase factor, with an exponent different from 1. The exponent of the power may be determined based on a function specifying a microphone distance as a function of frequency band.

As the matrix is generated based on the correlation function, such that the matrix elements may include non-linear functions of phase factors associated with the different frequency components, variations or discontinuities in the phase difference that are caused by the variation of microphone distance with frequency band may be accounted for in the matrix generated from the phase factors. The matrix may be constructed such that it is a Hermitian matrix. The matrix may be constructed such that, for the case in which a single sound source emits sound toward the array of microphones in a noiseless environment, a steering vector corresponding to a direction of the sound source is the only eigenvector of the matrix associated with a non-vanishing eigenvalue. As used herein, the term "steering vector" refers to a vector having vector components that correspond to phase factors accrued by planar sound waves incident on the array of microphones from a specified direction when detected by a pair of microphones having a distance which, according to embodiments, is dependent on the respective frequency band.

In one embodiment, the matrix may be generated such that each matrix element is determined based on a phase factor of a frequency component of the correlation function, at least one of the matrix elements being a power of one of the phase factors with an exponent different from 1. For a matrix element in row k and column n of the matrix, where $0 \leq k, n \leq N-1$, the exponent of the power may be based on a microphone distance associated with frequency band k and a microphone distance associated with frequency band n, k and n being labels for the respective frequency bands. The exponent of the power may be further based on a microphone distance associated with a frequency band $|k-n|$.

In the method, a set of eigenvectors of the matrix may be determined. For example, the full eigenspectrum of the matrix may be determined and the set of eigenvectors may be selected from the eigenvectors of the matrix. The set of eigenvectors may include the eigenvectors which are associated with eigenvalues smaller than a predetermined threshold. This sub-space may be associated with noise. The direction of the sound source may be determined by projecting a steering vector into the noise sub-space and determining an angle of incidence so that the projection of the steering vector into the noise sub-space has minimum length, i.e., that a norm of the projection becomes minimum. Thereby, a steering vector that is essentially normal to the noise sub-space may be identified.

The array of microphones may be a nested linear array of microphones. In applications in which a nested linear microphone array is used in, for example, beamforming, the same nested array of microphones may also be used to detect the direction of sound sources using the method according to any one aspect or embodiment of the invention. The direction of the sound source or of the several sound sources may be determined based on a frequency-domain MUSIC-algorithm modified so as to use varying microphone distances.

According to another aspect of the invention, a computer program product is provided which has stored thereon instructions which, when executed by a processor of an electronic device, direct the electronic device to perform the method according to an aspect or embodiment of the invention.

According to another aspect of the invention, a device for locating a sound source is provided, which detects a direction of a sound source based on sound received at an array of microphones. The device comprises an input to receive signals provided by the microphones of the array, and a direction estimator coupled to the input and having a processor. The processor is configured to determine a correlation function of the signals received at the input. To determine a frequency component of the correlation function associated with a given frequency band, the processor selects a pair of signals received at the input and originating from a pair of microphones such that the pair of microphones has a distance varying as a function of the given frequency band. The direction estimator establishes a direction in which a sound source is located based on at least one eigenvector of a matrix having matrix elements which are based on the correlation function.

Such a device may be adapted to perform the method of locating a sound source according to any one aspect or embodiment. In particular, the device is adapted to determine one or several sound sources using a variable microphone distance by appropriately selecting signals received at the input as a function of frequency band to determine the corresponding frequency component of the correlation function.

The direction estimator may be implemented as a combination of software or firmware and hardware. In particular, the direction estimator may be implemented by providing instruction code to be executed by the processor.

The device may further comprise a nested linear array of microphones coupled to the input to provide the signals thereto. The nested array of microphones may be shared among different devices and/or applications. For example, one microphone array may be used to provide signals to the device for locating a sound source, and to provide these signals to a speech control or speech communication system.

The methods and devices according to the various aspects and embodiments of the invention may be utilized in all fields of application in which it is desirable or required to identify a direction in which a sound source is located. It is anticipated that speech control systems, e.g., in a navigation device installed in a vehicle, in a home entertainment system, or similar, or speech communication systems, e.g., in hands free telephony applications, are possible fields of application. However, the present invention is not limited to these specific applications.

BRIEF DESCRIPTION OF THE DRAWINGS

The invention will now be described in more detail with reference to the accompanying drawing.

DETAILED DESCRIPTION OF PREFERRED EMBODIMENTS

Hereinafter, exemplary embodiments of the invention will be described with reference to the drawings. It is to be understood that the present invention is not limited to the specific embodiments described herein and that, unless explicitly stated otherwise, the features of the various embodiments may be combined with each other.

According to embodiments of the invention, methods of and devices for locating a sound source are provided. In these methods and devices, a direction of the sound source is determined from at least one eigenvector of a matrix. The matrix has matrix elements that are determined based on signals from microphones of an array of microphones and, in particular, are based on a correlation function of signals provided by microphones of the array. As used herein, the term "correlation function" generally refers to any quantity that may be derived from signals provided by the microphones of the array. The correlation function may be determined from time-domain or frequency-domain, analog or digital signals. Further, and as will be described in more detail below, the signals that are evaluated to determine the correlation function may be selected so as to vary based on a frequency band. For example, a first pair of signals from a first pair of microphones may be evaluated to determine a frequency component of the correlation function associated with a first frequency band, and a second pair of signals from a second pair of microphones may be evaluated to determine a frequency component of the correlation function associated with a second frequency band.

As used herein, the term "frequency band" refers to any interval of frequencies. Typically, one characteristic frequency, e.g., the center frequency or upper or lower limit frequency, may be associated with each frequency band. Therefore, any set of discrete frequencies defines a plurality of frequency bands. A quantity associated with a given frequency band, such as a frequency component of the correlation function, may be evaluated at any one frequency characteristic of the frequency band. The term "frequency" is used herein to refer both to the inverse of an oscillation period, and to an associated angular frequency, it being understood that these two quantities only differ by a constant factor of $2\pi$. Further, it is to be understood that any time or frequency mentioned herein may be appropriately normalized to a give reference time. I.e., any time or frequency mentioned herein may be measured in units of a pre-determined sampling interval length and its inverse, respectively.

Figure 1:
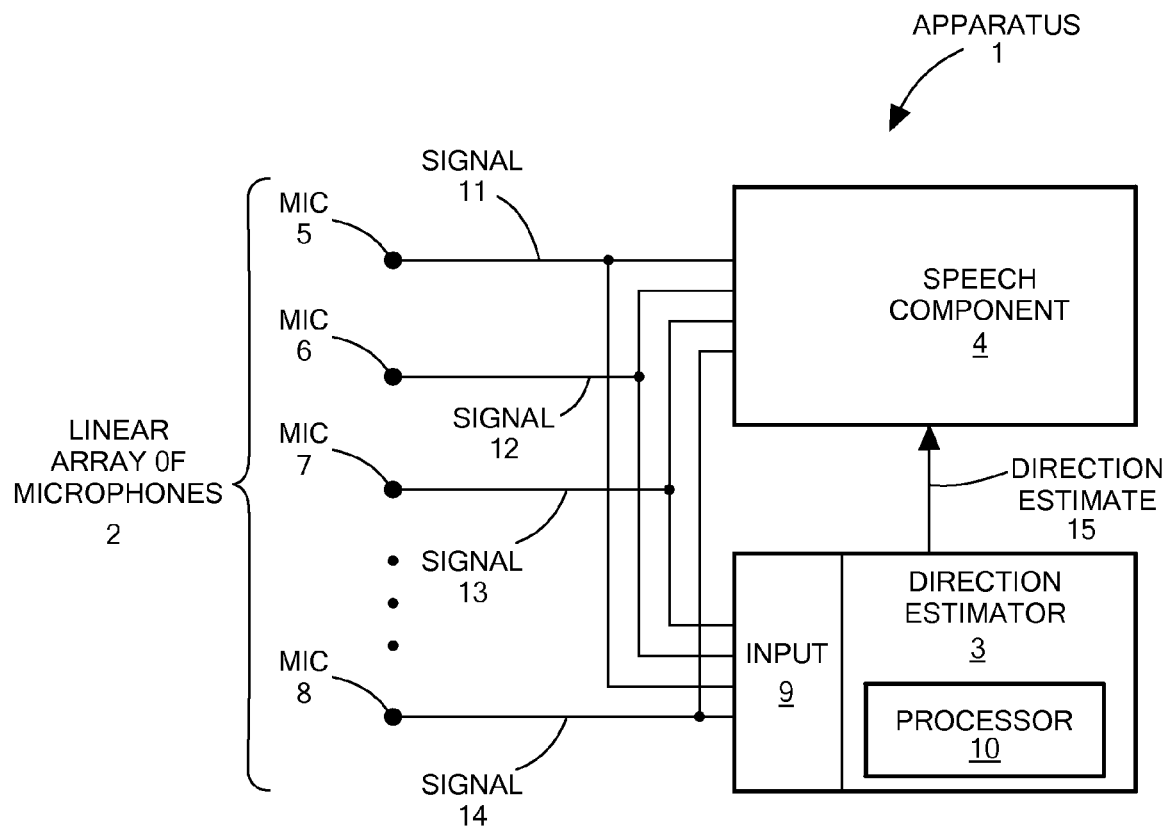
FIG. 1 is a block diagram representation of an apparatus equipped with a device for locating a sound source.

FIG. 1 is a schematic block diagram representation of an apparatus 1 equipped with a device for locating a sound source according to an embodiment of the invention. The apparatus 1 has a linear array 2 of equally spaced microphones, a direction estimator 3 and a component 4 which has an input for receiving directional information on a sound source from the direction estimator 3. The component 4 may be configured for speech control or speech communication purposes. For example, the component 4 may be included in a home entertainment system, a telephone, a portable electronic device having a microphone, or other systems in which information on the direction of a sound source may be useful. In some of these applications, the information on the direction of the sound source may be used to enhance the processing and/or transmission of sound signals. While the component 4 is shown to be also coupled to the microphone array 2 in the apparatus 1, this need not be the case in all applications. For example, in another application, the component 4 may be a control component for a video camera or other optical device that directs the camera or other optical device to monitor a region in which the sound source is determined to be located. In such applications, no direct connection between the array 2 and the component 4 is required.

The array 2 of microphones includes a plurality of microphones 5-8. While the number of microphones may generally vary as appropriate, the array 2 of microphones generally includes at least three microphones.

The microphones 5-8 are coupled to an input 9 of the direction estimator 3 to provide signals 11-14 to the direction estimator 3. The microphone signals 11-14 are indicative of sound received at the respective microphones 5-8. As the signals 11-14 correspond to sound received at different locations of a sound wave field, the array 2 allows the sound wave field to be spatially sampled.

The direction estimator 3 has a processor 10 which determines a correlation function based on the signals 11-14. The direction estimator 3 establishes a direction in which a sound source is located by determining an eigenspectrum of a matrix which has matrix elements that are based on the correlation function. In this regard, the operation of the direction estimator 3 is similar to the conventional "MUltiple SIgnal Classification" (MUSIC)-algorithm in the frequency domain. The established direction is output to the component 4 as signal 15.

However, as will be described in more detail below, the processor 10 selects pairs of microphones having varying distance in order to determine various frequency components of the correlation function. The various frequency components correspond to different frequency bands. In this manner, a nested microphone array, in which different microphone distances are implemented, may be combined with the identification of sound source directions based on a spectral decomposition of a matrix, as found in the MUSIC-algorithm, that allows the directions of plural sound sources to be resolved.

The processor 10 of the direction estimator 3 may operate in accordance with a method that will be described with reference to FIGS. 2-8 below.

The operation of the direction estimator 3 is essentially based on a time delay estimation process, in which the time delay or phase difference of the same signal when received at different microphones 5-8 of the array 2 is used to derive information on the direction of the sound source.

Figure 2:
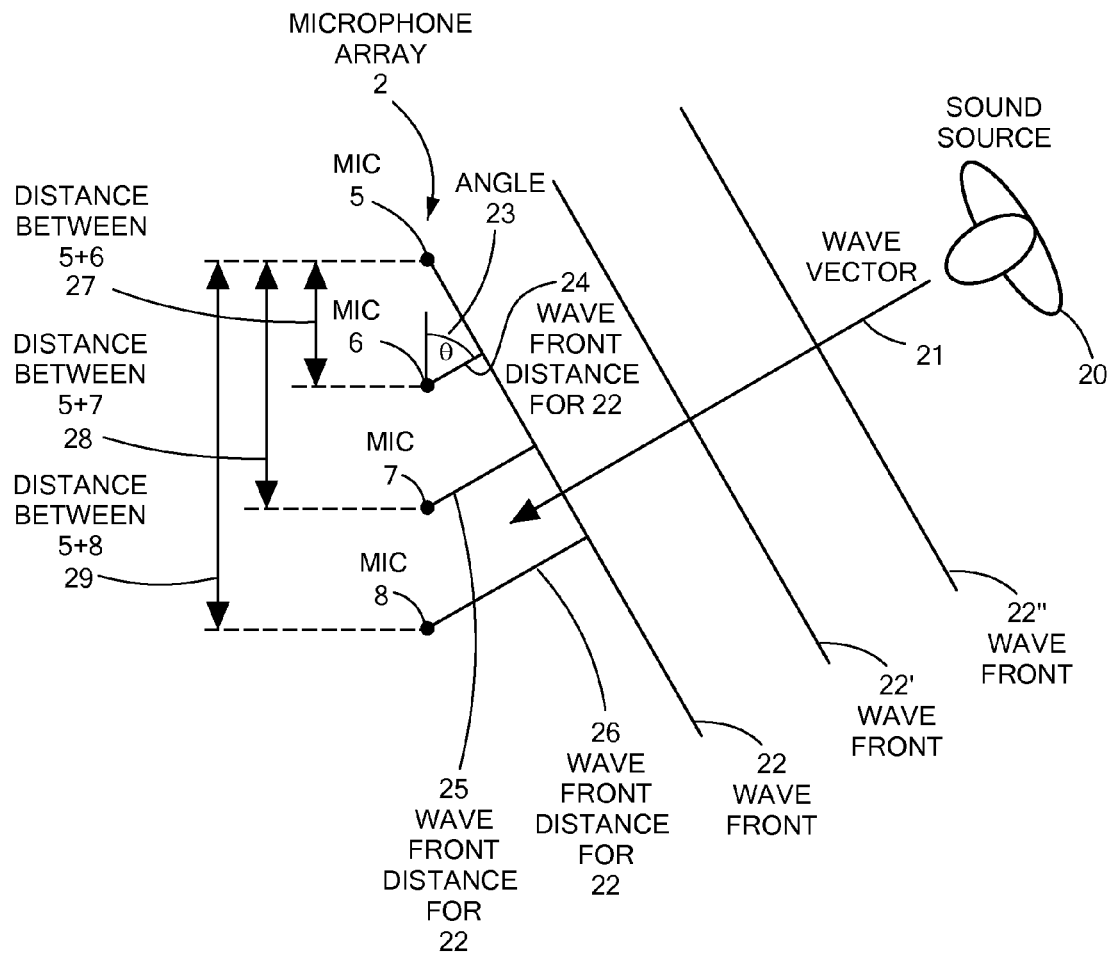
FIG. 2 is a schematic representation of sound incident from a sound source onto an array of microphones.

FIG. 2 is a schematic illustration of the microphone array 2 having, in the exemplary implementation illustrated, four equally spaced microphones 5-8. A sound source 20 emits sound toward the array 2. In the far field approximation, which will be assumed to hold at least in a neighbourhood of the microphone array 2 hereinafter, the sound propagates in a direction determined by a wave vector 21 directed perpendicularly to wave fronts 22, 22', 22". The direction of the wave vector 21 corresponds to the direction of the sound source 20 relative to the microphone array 2 and may be quantified by an angle $\theta$ enclosed by the wave vector 21 and the line along which the microphone array 2 is arranged, as schematically indicated at 23.

In time delay estimation techniques, use is made of the fact that one wave front arrives at different microphones of the array with a time delay that is determined not only by the microphone spacing, but also depends on the direction of incidence of the sound wave. For example, in FIG. 2, the wave front 22 will have to travel a distance 24, which is equal to a distance 27 between the microphones 5 and 6 multiplied by the cosine of the angle $\theta$, before arriving at the microphone 6. Similarly, the wave front 22 will have to travel distances 25, 26, which correspond to the product of a microphone distance 28, 29 and the cosine of $\theta$, before arriving at the microphones 7 and 8, respectively. The resulting time delay leads to a phase shift in the signals $x_1(t)$ and $x_m(t)$ output from a first and m-th microphone in the array 2.

In the frequency domain, i.e., after performing a Fourier-transform of the time-domain signals, the phase shift gives rise to a phase factor. In the case of a single sound source, for example, the Fourier-transformed signal from a first microphone of the array may be written in the form $$X_1(e^{j\omega(i)}) = Q(e^{j\omega(i)}) \cdot \exp(-j\omega(i)t_1) + N_1(e^{j\omega(i)}), \quad (1)$$

where the first term represents a signal corresponding to sound from the sound source 20, whereas the second term represents noise. Here, $\omega(i)$ is one of plural discrete frequencies, i being a frequency band label. Each one of the frequencies $\omega(i)$ may be equal to i multiplied by a basic frequency $\Omega$. $Q(\cdot)$ is the frequency spectrum of sound emitted by the sound source 20, and $N_1(\cdot)$ is the frequency spectrum of background noise received at the first microphone, respectively. In the first term on the right-hand side of Equation (1), the phase of the signal component originating from the sound source has been explicitly included, $t_1$ being a time of arrival at the first microphone. Throughout, j denotes the imaginary unit.

Similarly, the Fourier-transformed signal of a m-th microphone of the array may be written in the form $$X_m(e^{j\omega(i)}) = Q(e^{j\omega(i)}) \cdot \exp(-j\omega(i)t_m) + N_m(e^{j\omega(i)}), \quad (2)$$

where $Q(\cdot)$ is the frequency spectrum of sound originating at the sound source 20, and $N_m(\cdot)$ is the frequency spectrum of background noise received at the m-th microphone, respectively. The time $t_m$ denotes a time of arrival at the m-th microphone.

The phase shift between signals originating from the sound source 20 may be determined from the phase factors of the first terms in Equations (1) and (2), respectively:

$$a_S(e^{j\omega(i)}) = \frac{\exp(-j\omega(i)t_1)}{\exp(-j\omega(i)t_m)} \quad (3)$$
$$= \exp(-j\omega(i)(t_1 - t_m))$$
$$= \exp(-j\phi_S).$$

As the delay time $\tau$ for sound from the sound source to arrive at the first and m-th microphone of the array, $$\tau = t_1 - t_m = \frac{d}{c} \cdot \cos(\theta), \quad (4)$$

is proportional to the distance d between the microphones and the cosine of the angle of incidence $\theta$, the phase shift may be re-written as $$\phi_S = \omega(i) \cdot \frac{d}{c} \cdot \cos(\theta). \quad (5)$$

In Equations (4) and (5), c is the sound velocity.

The direction of the sound source 20 may be determined from Equation (5), when the phase shift $\phi_s$ is determined from signals output by microphones located at a known distance d.

The phase factor $\phi_s$ derived from signals output by a pair of microphones will usually deviate from the expression of Equation (5), due to background noise. Determining a phase shift not only for one, but for several frequencies $\omega(i)$ is one possible approach to account for such background noise when locating a sound source. In this case, a phase shift for each one of N frequencies $\omega(i)$, where $0 \leq i \leq N-1$, can be experimentally determined as a quotient of the Fourier-transformed microphone output signals. The thus measured phase shifts may be compared to a set of N phase shifts expected in accordance with Equations (3) and (5) for a noiseless environment. The value of the angle $\theta$ may be derived based on the criterion that a best match is to be achieved between the phase shifts expected for a given angle of incidence $\theta$ and the measured phase shifts. The expected phase shifts may be arranged in a vector $$\vec{p} = (a_s(e^{j\omega(0)}), a_s(e^{j\omega(1)}), \ldots, a_s(e^{j\omega(N-1)}))^T \quad (6)$$

having complex-valued components, which correspond to the anticipated phase factors associated with the frequencies $\omega(i)$. In the context of beamforming, this vector is commonly known as steering vector.

When the microphone distance d has a fixed value, i.e., when signals from any given, fixed pair of microphones are used to determine the phase shift for each one of the frequencies $\omega(i)$, the phase shifts in the vector components of Equation (6), i.e., the arguments of the vector components, increase linearly with $\omega(i)$.

In accordance with various embodiments of the invention, a microphone array having at least three microphones is used in locating a sound source, and the distance between microphones is made to vary depending on frequency band. While, for each one of the frequencies $\omega(i)$, the associated phase shift or phase factor may still be determined by correlating signals from one pair of microphones only, the pair of microphones may respectively be selected so as to have a distance d(i) varying with frequency $\omega(i)$. Here, d(i) denotes a pre-determined, non-constant function specifying a microphone distance as a function of frequency band. With varying microphone distance, the time delay $$\tau(i) = \frac{d(i)}{c} \cdot \cos(\theta) \quad (7)$$

also becomes a function of frequency band. The phase shift for frequency band i in a noiseless environment, $$\phi_S = \omega(i) \cdot \frac{d(i)}{c} \cdot \cos(\theta), \quad (8)$$

then is no longer a simple linear function of frequency.

In accordance with various embodiments of the invention, the microphone distance d(i) may be selected such that it is larger for smaller frequencies than for larger frequencies. For this choice of d(i), the phase shift of Equation (8) increases more strongly as a function of frequency $\omega(i)$ when $\omega(i)$ is small, while the phase shift increase with frequency becomes slower for larger $\omega(i)$.

Reverting to FIG. 2, the microphones 5 and 8 of the array 2 may be selected to provide signals used in order to determine a phase shift for a first set of frequency bands with $\omega(i) \leq \omega^{(1)}$, the microphones 5 and 8 having the distance 29. The microphones 5 and 7 of the array 2 may be selected to provide signals used in order to determine a phase shift for a second set of frequency bands with $\omega^{(1)} < \omega(i) \leq \omega^{(2)}$, the microphones 5 and 7 having the distance 28 which is smaller than the distance 29. Finally, the microphones 5 and 6 of the array 2 may be selected to provide signals used in order to determine a phase shift for a third set of frequency bands with $\omega^{(2)} < \omega(i)$, the microphones 5 and 6 having the distance 27 which is smaller than the distance 28.

Figure 3:
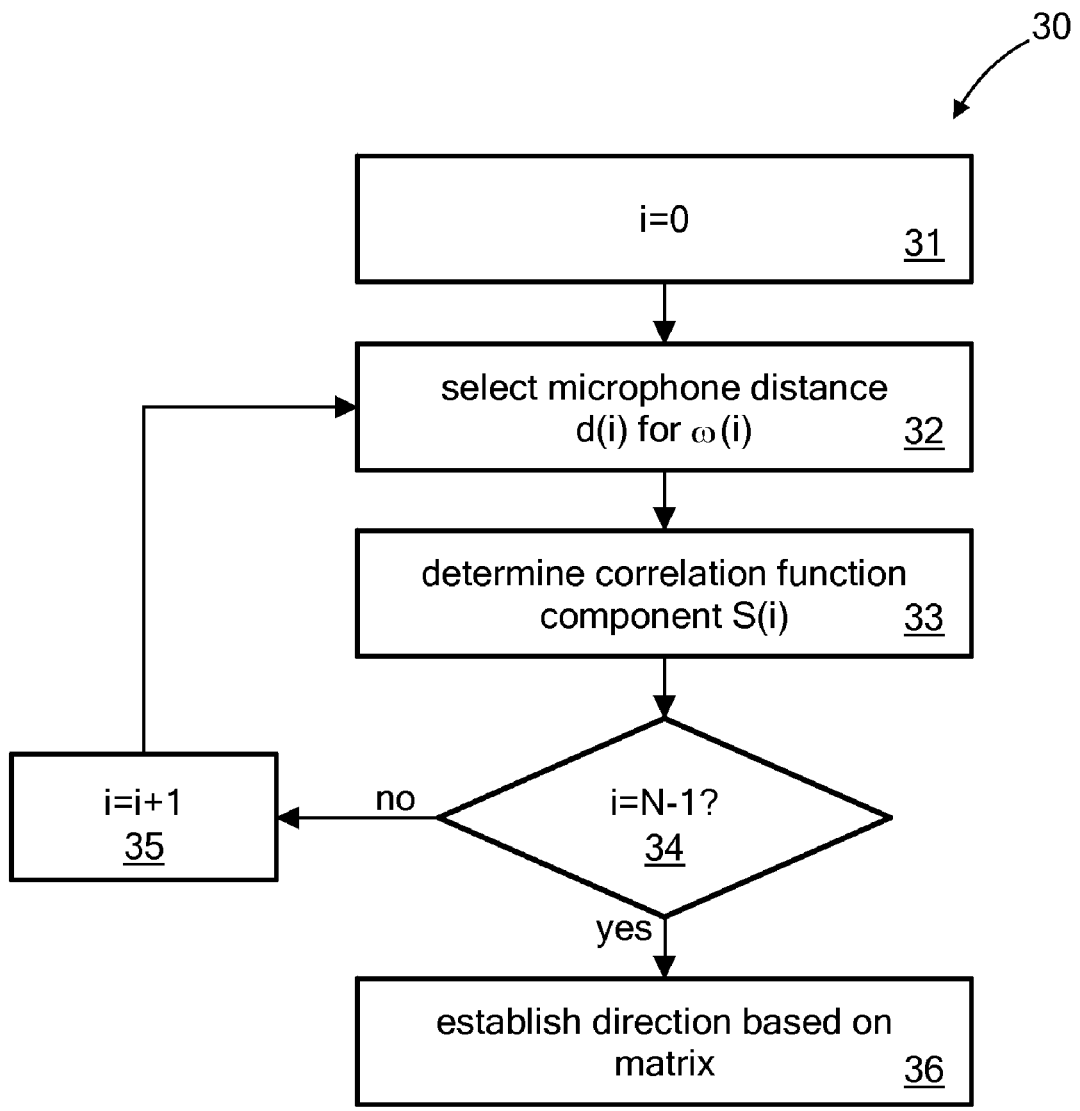
FIG. 3 is a flow diagram representation of a method of locating a sound source.

FIG. 3 is a flow diagram representation of a method of locating a sound source. The method may be performed by the direction estimator 3 of FIG. 1 and, more particularly, by the processor 10 of the direction estimator 3. The method, which is generally indicated at 30, uses varying microphone distances in order to derive information on phase shifts associated with different frequency bands.

At 31-35, an iteration is performed over N frequency bands labelled by an integer i, with $0 \leq i \leq N-1$. Each of the frequency bands has a characteristic frequency $\omega(i)$, for example, the center frequency of the frequency band. At 31, the iteration is started by setting i to an initial value of 0. At 32, a microphone distance $d(i)$ is selected as a function of the respective frequency band. The functional dependence $d(i)$ may be a predetermined function that can be selected based on the total number of microphones in the array, anticipated frequency spectrums of sound sources, the maximum frequency $\omega(N-1)$, and similar. The microphone distance $d(i)$ represents a distance of microphones that provide signals which are used to determine a phase shift, or time delay, associated with the respective frequency band. At 33, a component of a correlation function is determined which is associated with the respective frequency band i. This quantity, referred to as frequency component $S(i)$ of the correlation function in the following, includes information on the phase shift between microphones having distance $d(i)$. At 34, it is verified whether $S(i)$ has been determined for all frequency bands i. If $S(i)$ has not yet been determined for all frequency bands i, the method proceeds to 35. At 35, i is incremented by 1, and the method returns to 32. If, at 34, it is determined that $S(i)$ has been determined for all frequency bands i, the method proceeds to 36. At 36, a matrix is generated based on the frequency components $S(i)$ of the correlation function, and the direction of the sound source is determined based on the matrix. Establishing the direction of the sound source at 36 may involve determining an eigenspectrum of the matrix, as will be explained in more detail with reference to FIGS. 7 and 8 below.

The frequency component $S(i)$ of the correlation function associated with frequency band i and determined at 33 may be determined in any one of a number of suitable ways. For example, signals provided by a pair of microphones having distance $d(i)$ may be selected, multiplied with each other and the product may be averaged over time. The signals may be time-domain or frequency-domain signals.

In a linear array of equally spaced microphones, in which the microphones are consecutively numbered starting from one of the outermost microphones, e.g., the microphone labelled 5 in FIGS. 1 and 2, $S(i)$ may be determined based on signals from the first, i.e., outermost microphone and from the m-th microphone of the array, where m is selected based on the microphone distance $d(i)$ so that $$m = d(i)/d_{nn}. \qquad (9)$$

Here, $d_{nn}$ is the spacing of neighbouring microphones.

The frequency component $S(i)$ may be determined by performing a smoothing operation on the product of the Fourier-transformed signal outputs of the first and m-th microphones, $$S(i) = Sm\{X_1(e^{j\omega(i)}) \cdot X_m^*(e^{j\omega(i)})\} \qquad (10)$$

Here, $Sm\{\bullet\}$ denotes a smoothing operation that may be implemented by temporal averaging. The Fourier-transformed frequency-domain signals $X_1$ and $X_m$ may be obtained from time-domain data sampled during a first interval, while the smoothing operation may be performed by integration over time in a second interval which is significantly longer than the first interval.

The frequency component $S(i)$ of the correlation function as defined in Equation (10) is a complex number having a phase factor $$z(i) = \frac{S(i)}{|S(i)|}. \qquad (11)$$

In a noiseless environment, $z(i)$ is given by Equations (3) with the phases being determined by Equation (8), Owing to the fact that the microphone distance $d(i)$ varies as a function of frequency band and the argument of $z(i)$ therefore is a non-linear function of frequency $\omega(i)$. As will be explained in more detail with reference to FIGS. 7 and 8 below, the matrix generated at 36 may have matrix elements that include powers of the phase factors $z(i)$, and the direction of the sound source may be established by a spectral decomposition of the matrix.

The determination of the frequency components $S(i)$ and phase factors $z(i)$ as explained with reference to Equations (10) and (11) above is provided for illustration rather than limitation. In particular, in the method of FIG. 3, the frequency components $S(i)$ of the correlation function may be determined in any manner that allows a phase shift and/or time delay between a signal pair to be derived.

Further, the steps explained with reference to FIG. 3 do not need to be performed in the indicated order. For example, depending on the specific circumstances and the specific implementation of step 33, the various frequency components of the correlation function may be determined simultaneously rather than successively.

Figure 4:
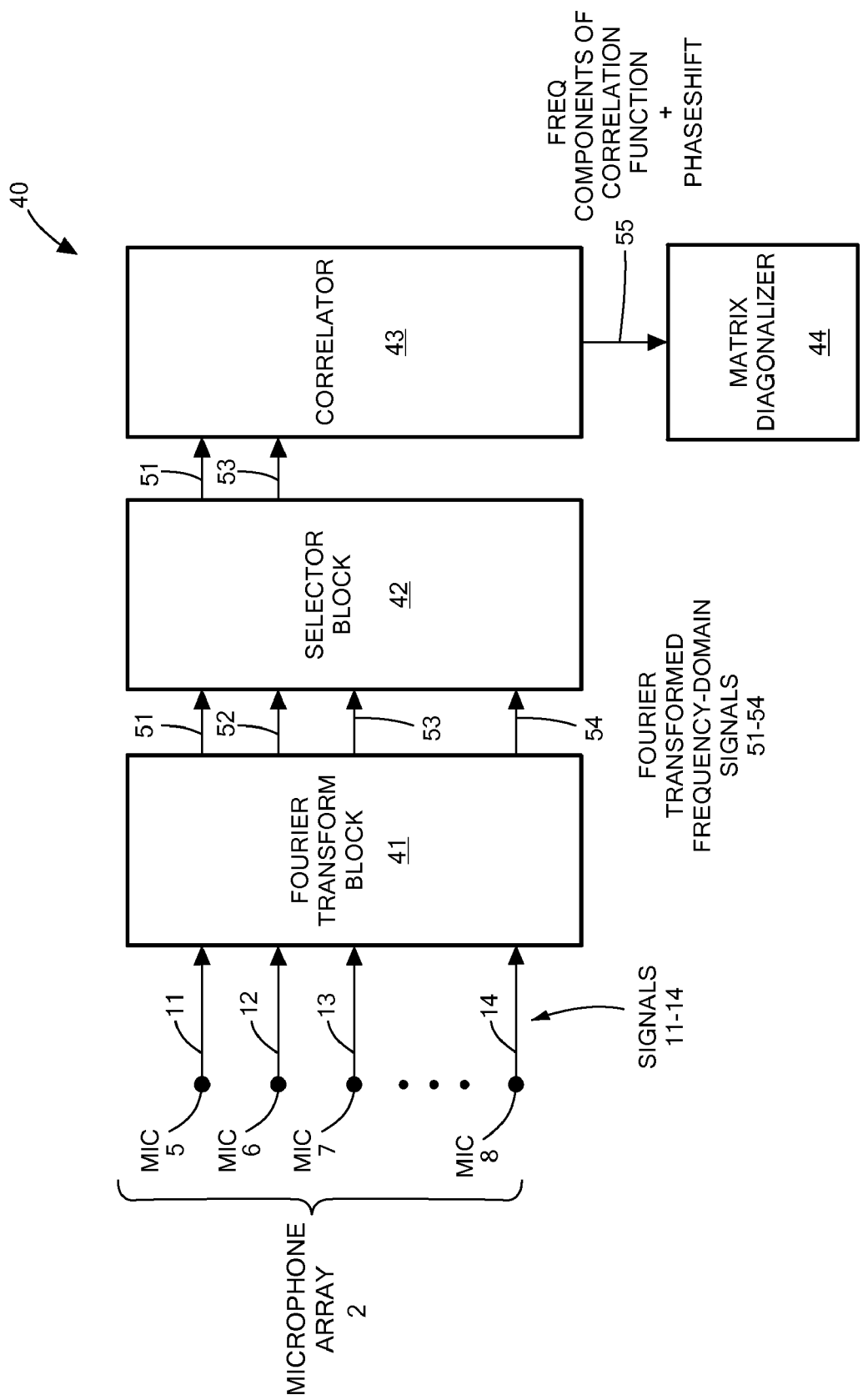
FIG. 4 is a schematic representation of signal processing performed in the method of locating a sound source.

FIG. 4 is a schematic illustration 40 of signal processing performed in a method according to an embodiment. This signal processing may be performed at steps 32 and 33 in the method 30 of FIG. 3. The signal processing may be performed by the processor 10 of the apparatus 1 of FIG. 1. In particular, the various blocks 41-44 explained in more detail below may be implemented in software executed by the processor 10 of the apparatus 1.

The signals 11-14 provided by the microphones 5-8 of the array 2 are received at a Fourier transform block 41. The Fourier transform block 41 generates Fourier-transformed frequency-domain signals 51-54 from the signals 11-14. The frequency-domain signals 51-54 are received at a selector block 42, which selects two of the frequency-domain signals 51, 53. The selection made by the selector block 42 is a function of the frequency band for which the phase shift is to be determined. The signals selected at the selector block 42 are selected such that the associated microphones have a distance determined as a function of the respective frequency band. The selector block 42 provides the selected signals 51, 53 to a correlator block 43, where the signals 51, 53 are correlated. The correlator block 43 determines information on a phase shift, phase factor, time delay or similar of signals 11 and 13. In one implementation, the correlator block 43 calculates the respective frequency component of the correlation function using Equation (10). The determined information on the phase shift, phase factor or time delay, which is associated with the respective frequency band and the microphone distance selected for the respective frequency band, is then provided to a matrix diagonalizer 44 as signal 55. One possible mode of operation of the matrix diagonalizer 44 will be explained in more detail with reference to FIGS. 7 and 8.

In other embodiments, the signal processing may be modified as compared to FIG. 4. For example, the Fourier transform block 41 could be implemented downstream of the selector block 42. In yet other embodiments, the Fourier transform block 41 could be integrated with the correlator block 43, or could be omitted.

In the signal processing illustrated in FIG. 4, the signals 51, 53 are selected by the selector block 42 in accordance with a function d(i) specifying the microphone distance as a function of frequency band. Therefore, for other frequency bands, signals different from the signals 51, 53 may be provided from the selector 42 to the correlator 43, as will be further explained with reference to FIG. 5.

FIG. 5 is a further schematic illustration of signal processing performed in a method according to an embodiment. This signal processing may be performed in different iterations at steps 32 and 33 in the method 30 of FIG. 3. The signal processing may be performed by the processor 10 of the apparatus 1 of FIG. 1. Elements that are identical or similar in operation to elements shown in FIG. 4 have the same reference numerals. While a linear microphone array having four microphones is illustrated in FIG. 5, it is to be understood that other numbers of microphones may also be used.

Figure 5A:
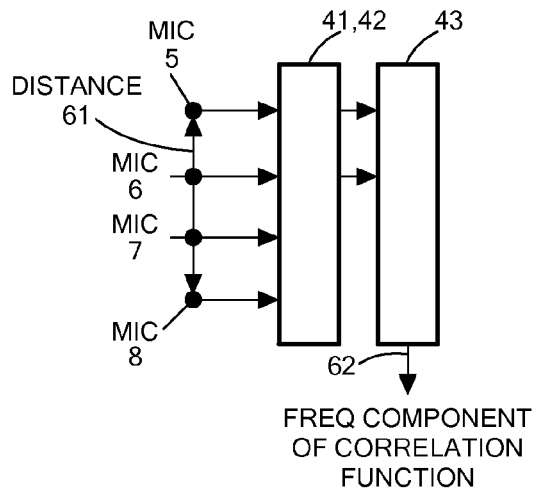
FIG. 5 is a further schematic representation of signal processing performed in the method of locating a sound source, FIGS. 5A-5C schematically illustrating signal processing for respectively one of several frequency bands, and FIG. 5D schematically illustrating a resulting correlation function.
Figure 5B:
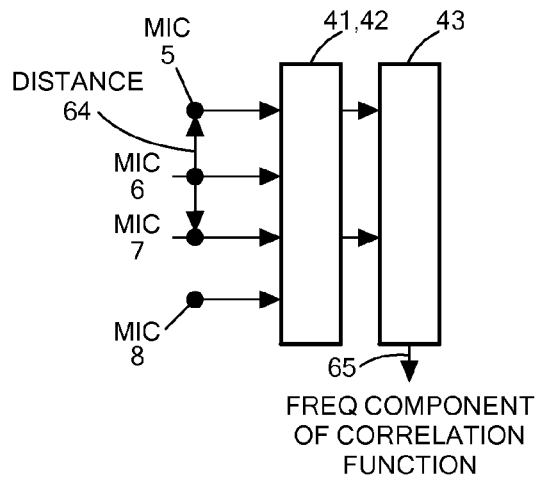
Figure 5C:
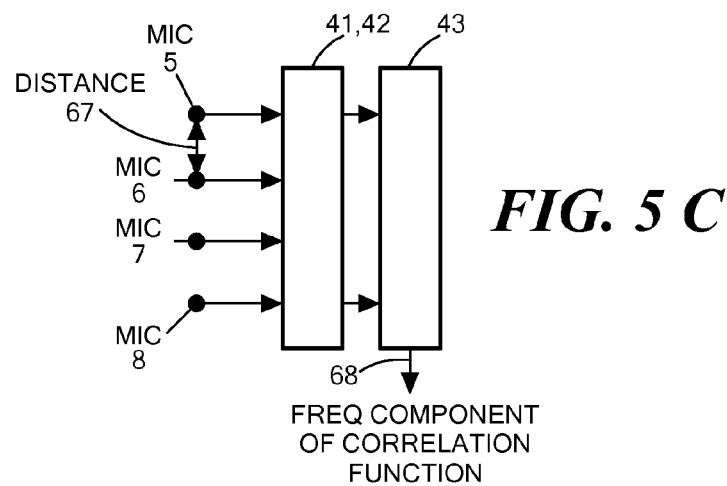

FIGS. 5A, 5B and 5C schematically illustrate the operation of the selector block 42 for frequency bands having low, intermediate and high frequencies, respectively. As shown in FIG. 5A, for low frequencies, signals from microphones 5 and 8 having a distance 61 equal to three times the nearest neighbour microphone distance are selected. Based on these signals, the respective frequency component of the correlation function is determined and output as signal 62. As shown in FIG. 5B, for intermediate frequencies, signals from microphones 5 and 7 having a distance 62 equal to two times the nearest neighbour microphone distance are selected. Based on these signals, the respective frequency component of the correlation function is determined and output as signal 65. As shown in FIG. 5C, for high frequencies, signals from microphones 5 and 6 having a distance 67 equal to the nearest neighbour microphone distance are selected. Based on these signals, the respective frequency component of the correlation function is determined and output as signal 68. Of course, other pairs of microphones can also be selected from the array, provided that they have the distance required for the respective frequency band in accordance with the pre-determined function d(i).

Figure 5D:
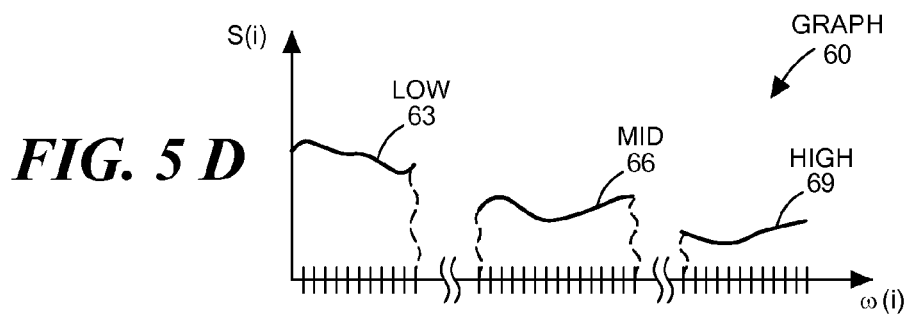
Figure 6:
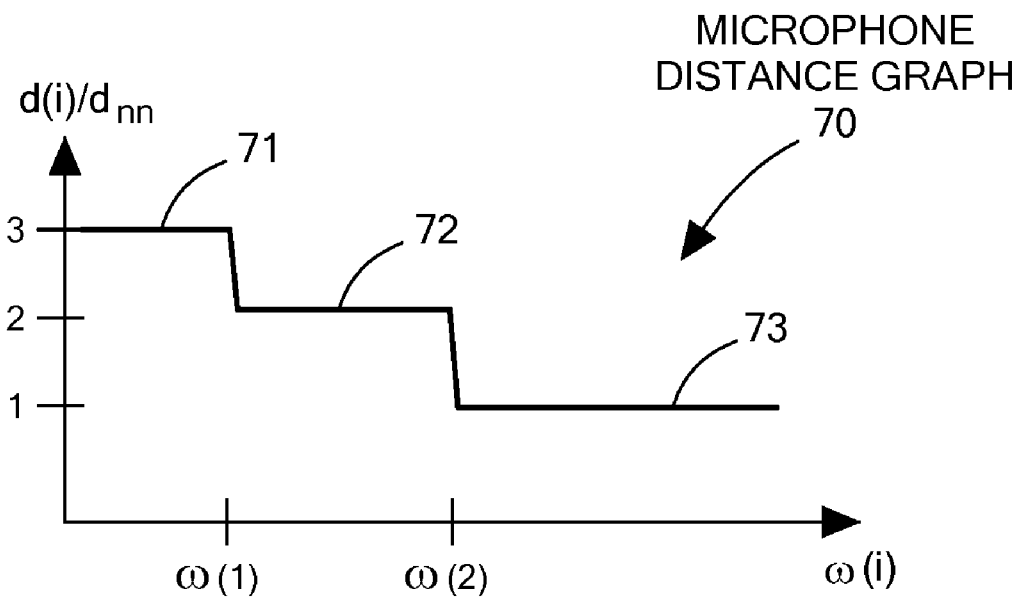
FIG. 6A illustrates a functional dependence of microphone distance on frequency band.
FIG. 6B illustrates a variation of a phase difference with frequency band.
Figure 6:
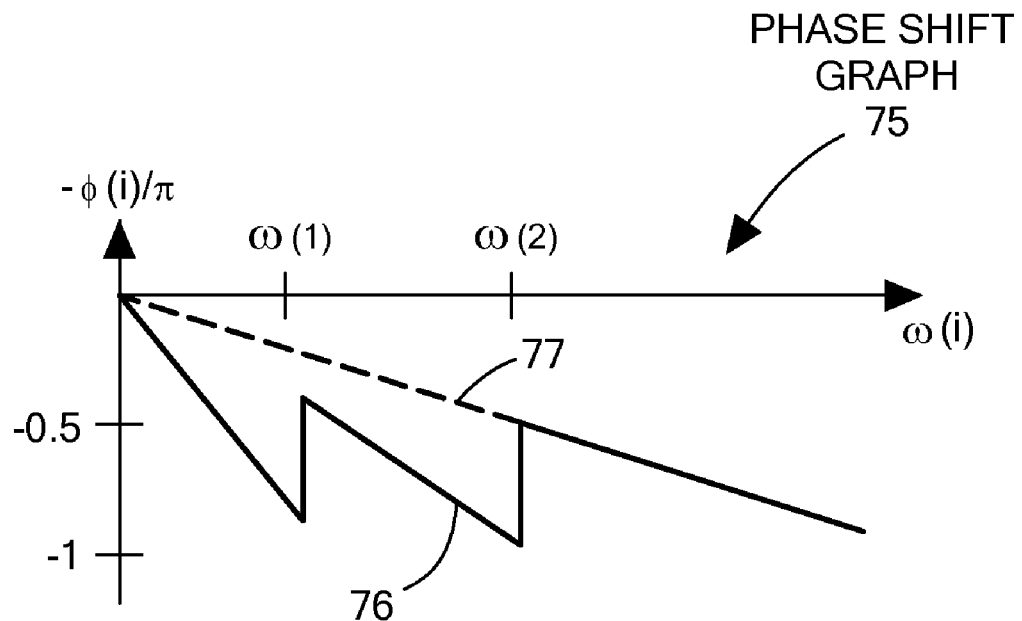

As schematically illustrated in the graph 60 of FIG. 5D, the frequency components S(i) of the correlation function may be determined as illustrated in FIGS. 5A-5C. For each frequency band, the frequency components S(i) is determined using signals from only one pair of microphones of the array. However, the distance between the microphones is made to vary by appropriately selecting the microphones for each one of the frequency components. Thus, the low-frequency portion 63 of S(i) is determined based on signals from microphones 5 and 8, the intermediate-frequency portion 66 of S(i) is determined based on signals from microphones 5 and 7, and the high-frequency portion 69 of S(i) is determined based on signals from microphones 5 and 6.

It is to be understood that FIG. 5D is intended to be a schematic representation only. For example, S(i) is a complex-valued function, and the phase is not shown in FIG. 5D. Indeed, the abrupt change in microphone distance when going from the low-frequency regime of FIG. 5A to the intermediate-frequency regime of FIG. 5B, and when going from the intermediate-frequency regime of FIG. 5B to the high-frequency regime of FIG. 5C, gives rise to discontinuities in the argument of the phase factor, as will be explained next with reference to FIG. 6.

FIG. 6A is an exemplary graph 70 of a microphone distance d(i) as a function of frequency band which may be employed in any one of the methods and devices described with reference to FIGS. 1-5 above. The microphone distance d(i) of FIG. 6A is a decreasing function of frequency band. However, d(i) is not a strictly decreasing function, but also has constant portions.

In the illustrated graph 70, d(i) is equal to three times the nearest neighbour microphone distance $d_{nn}$ in a portion 71 in which $\omega(i) \leq \omega^{(1)}$, d(i) is equal to twice the nearest neighbour microphone distance $d_{nn}$ in a portion 72 in which $\omega^{(1)} < \omega(i) \leq \omega^{(2)}$, and d(i) is equal to the nearest neighbour microphone distance $d_{nn}$ in a portion 71 in which $\omega^{(2)} < \omega(i)$. The functional dependence d(i) illustrated in FIG. 6A may give rise to a selection of signals as illustrated in FIGS. 5A-5C.

In other embodiments, d(i) may have more than three different values. The number of possible values may be selected as appropriate for the number of microphones in the microphone array and for the frequency range covered by the plurality of frequency bands.

FIG. 6B is a graph 75 of an exemplary phase shift $\phi(i)$ as a function of frequency band. The phase shift $\phi(i)$ results from a functional dependence of microphone distance d(i) on frequency band as illustrated in FIG. 6A. The phase shift $\phi(i)$, indicated by a solid line 76, is not a simple linear function of frequency $\omega(i)$, but rather has several sections with different slopes, namely for $\omega(i) \leq \omega^{(1)}$, $\omega^{(1)} < \omega(i) \leq \omega^{(2)}$, and $\omega^{(2)} < \omega(i)$. The phase shift has discontinuities at frequencies $\omega^{(1)}$ and $\omega^{(2)}$ at which the microphone distance is changed from one value to another value.

Further, due to the larger slopes in the frequency ranges $\omega(i) \leq \omega^{(1)}$ and $\omega^{(1)} < \omega(i) \leq \omega^{(2)}$, the phase shift $\phi(i)$ increases more rapidly to values that are sufficiently large to be more readily detectable. For comparison, the phase shift obtained for a constant microphone distance corresponding to $d_{nn}$ is indicated by a broken line 77.

The frequencies $\omega^{(1)}$ and $\omega^{(2)}$ at which d(i) changes may be determined as suitable for the specific application. In one embodiment, as illustrated in FIG. 6B, these frequencies are selected such that the modulus of the phase shift $\phi(i)$ approaches $\pi$ when $\omega(i)$ approaches, from the low-frequency side, one of the frequencies at which d(i) changes. In one implementation, as illustrated in FIG. 6B, the frequencies at which d(i) changes are selected such that the modulus of the phase shift $\phi(i)$ does not exceed $\pi$ when $\omega(i)$ approaches, from the low-frequency side, one of the frequencies at which d(i) changes.

Figure 7:
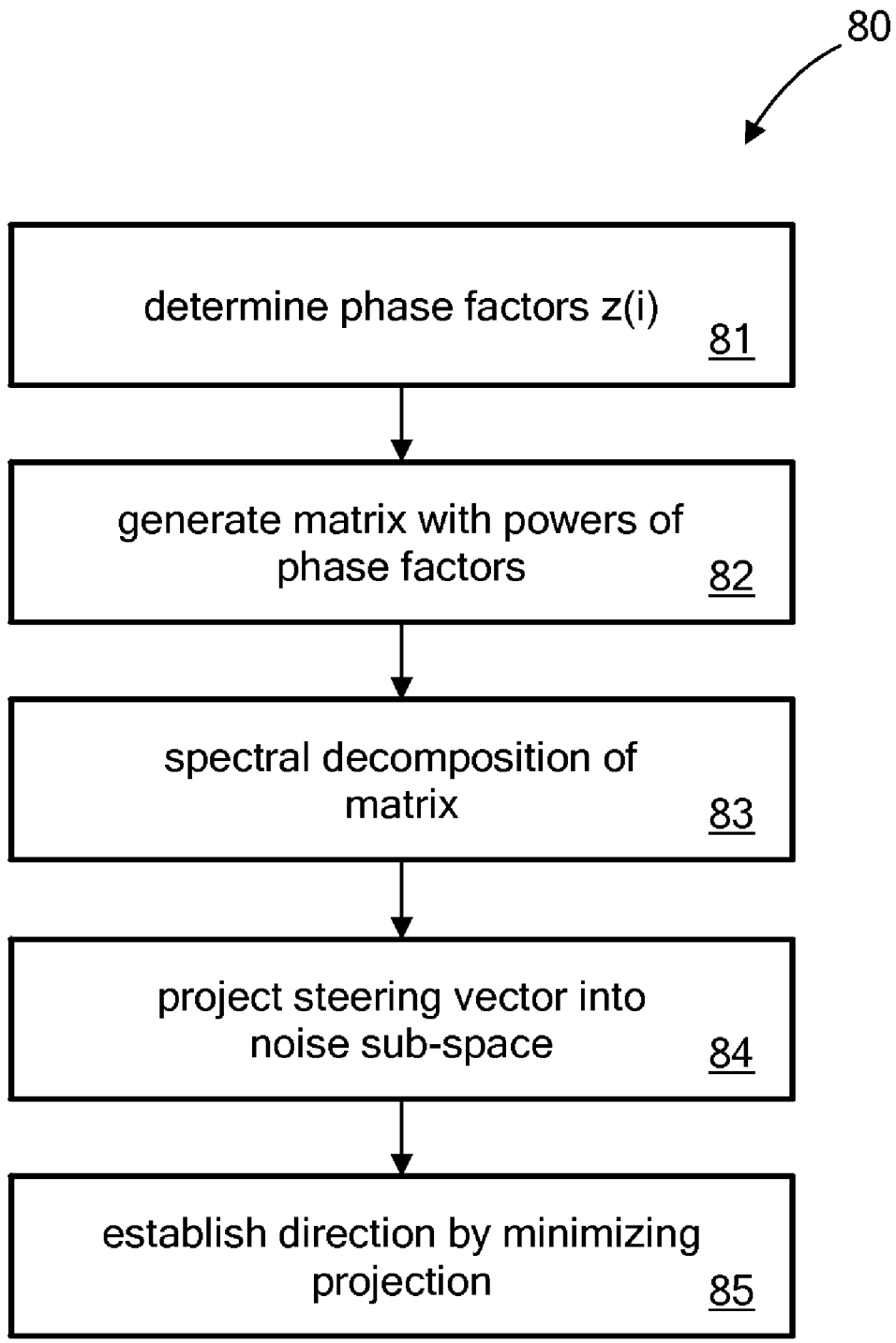
FIG. 7 is a flow diagram representation of a procedure that may be performed in a method of locating a sound source.

With reference to FIGS. 7 and 8, procedures will next be explained that use phase factors, or other information on phase shifts detected between signals from a microphone array, as an input parameter and establish the direction of one or several sound sources based thereon. The procedures explained below may, for example, be used to implement step 36 of the method 30 of FIG. 3. The procedures may be performed by the direction estimator 3 of the apparatus 1 of FIG. 1. In particular, the procedures may be implemented using software that directs the processor 10 of the direction estimator 3 to perform the procedures.

In one implementation, the procedure generates a matrix based on the measured phase factors, or other information on phase shifts, and determines at least one eigenvector of the matrix to derive a direction in which a sound source is located, or the directions in which several sound sources are located. The matrix is generated so as to account for the varying microphone distance d(i) that has been used to determine the phase factors, or other information on phase shifts. Therefore, the procedures provide techniques similar to the conventional frequency-domain MUSIC-algorithm, that allow the direction of one or several sound sources to be determined by performing a spectral decomposition of a matrix. However, the procedures allow for a varying microphone distance.

FIG. 7 is a flow diagram representation of a procedure generally indicated at 80. At 81, phase factors z(i) associated with the plurality of frequency bands are determined. The phase factors may be determined from the measured frequency components S(i) of the correlation function, in accordance with Equation (11). At 82, a matrix is generated. Matrix elements of the matrix include powers of the phase factors z(i), or other functions of the phase factors z(i), including complex conjugates of the phase factors z(i). At least one of the powers, and usually several of the powers, has an exponent different from 1. At 83, a spectral decomposition of the matrix is determined.

In one implementation, all eigenvalues and eigenvectors of the matrix are determined at 83. Based on the spectral decomposition, one or several eigenvectors of the matrix may be identified that are assigned to signals coming from a sound source or from several sound sources, while the other eigenvectors of the matrix are assigned to a noise sub-space. At 84 and 85, the direction of a sound source or of several sound sources is determined by projecting a steering vector into the noise sub-space and determining the angle of incidence θ of the steering vector such that this projection becomes minimum.

In one implementation of step 82, the matrix is generated such that, for the case of a single sound source in a noiseless environment, the steering vector corresponding to the sound source direction is an eigenvector of the matrix and is associated with the largest eigenvalue of the matrix. In one implementation of step 82, the matrix is generated such that, for the case of a single sound source in a noiseless environment, the steering vector corresponding to the sound source direction is the only eigenvector of the matrix that corresponds to a non-vanishing eigenvalue.

In one embodiment, the matrix H is defined as follows:

$$H_{k,n} = (z(k-n))^{f(k,n)} \text{ for } k \geq n, \text{ and} \quad (12a)$$

$$H_{k,n} = (z(n-k)^*)^{f(k,n)} \text{ for } k < n, \quad (12b)$$

where $0 \leq k, n \leq N-1$, and k and n are integer labels for the row and column, respectively, of matrix elements. The exponents f(k,n) are selected so as to account for the variation of microphone distance with frequency band and the corresponding non-linear behaviour of phase shift as a function of frequency band.

In matrix form, H may be rewritten as $$H = \begin{pmatrix} z(0) & (z(1)^*)^{f(0,1)} & \cdots & (z(N-1)^*)^{f(0,N-1)} \\ (z(1))^{f(1,0)} & z(0) & & \vdots \\ \vdots & & \ddots & (z(1)^*)^{f(N-2,N-1)} \\ (z(N-1))^{f(N-1,0)} & \cdots & (z(1))^{f(N-1,N-2)} & z(0) \end{pmatrix} \quad (13)$$

The exponents f(k,n) in Equations (12a) and (12b) are defined as follows:

$$f(k,n) = \frac{\omega(k) \cdot \tau(k) - \omega(n) \cdot \tau(n)}{\text{sign}(k-n) \cdot \omega(|k-n|) \cdot \tau(|k-n|)} \text{ for } k \neq n, \quad (14a)$$

and $$f(k,n) = 1 \text{ for } k = n. \quad (14b)$$

In Equation (14a), the time delay τ(•) is given by Equation (7) which accounts for the variation in microphone distance as a function of frequency band.

As may be seen from Equations (14a) and (7), as both the numerator and the denominator on the right-hand side of Equation (14a) are proportional to the cosine of θ and inversely proportional to the sound velocity c, the expression for the exponents f(k,n) may be re-written as $$f(k,n) = \frac{\omega(k) \cdot d(k) - \omega(n) \cdot d(n)}{\text{sign}(k-n) \cdot \omega(|k-n|) \cdot d(|k-n|)} \text{ for } k \neq n. \quad (15)$$

I.e., the exponents f(k,n) depend only on the frequencies associated with the different frequency bands and the known function d(i) that specifies the microphone distance as a function of frequency band.

When the frequencies ω(i) are integer multiples of a basic frequency Ω, $$\omega(i) = i \cdot \Omega, \quad (16)$$

Equation (15) can be further simplified to $$f(k,n) = \frac{k \cdot d(k) - n \cdot d(n)}{(k-n) \cdot d(|k-n|)} \text{ for } k \neq n. \quad (17)$$

As the exponents are symmetrical with respect to their two arguments, f(k,n)=f(n,k), the matrix H defined in Equations (12a), (12b), (14a) and (14b) is a Hermitian matrix, provided that z(0) is real. For the frequencies defined in Equation (16), z(0)=1 is always real.

Further, the matrix H has the property that, in a noiseless environment with a single sound source, the steering vector associated with the direction of the sound source is the only eigenvector of H which corresponds to a non-vanishing eigenvalue. As has been explained with reference to Equation (6) above, the steering vector is a vector having vector components that correspond to the phase factors for the different frequency bands. However, due to the variation of microphone distance with frequency band, the phase shifts are now determined by Equation (8) and depend on the frequency band both via the frequency (i) and via the frequency-band dependent microphone distance, which leads to a frequency-band dependent time delay. For variable microphone distance, the steering vector therefore reads $$\vec{p} = (e^{-j\omega(0)\tau(0)}, e^{-j\omega(1)\tau(1)}, \ldots, e^{-j\omega(N-1)\tau(N-1)})^T, \quad (18)$$

the k-th component of the steering vector being $$p_k = \exp(-j\omega(k) \cdot \tau(k)). \quad (19)$$

By evaluating the matrix element defined in Equations (12a) and (14a) for a noiseless environment and a single sound source, it may be seen that $$H_{k,n}|_{\vec{z}=\vec{p}} = (e^{-j\omega(k-n)\tau(k-n)})^{f(k,n)} \quad (20)$$
$$= \exp(-j\omega(k-n) \cdot \tau(k-n) \cdot f(k,n))$$
$$= \exp(-j(\omega(k) \cdot \tau(k) - \omega(n) \cdot \tau(n)))$$
$$= p_k \cdot p_n^*.$$

While Equation (20) is valid for matrix elements with k>n, the equality relation also holds for k≦n, and therefore, for every matrix element of H. Consequently, H may be rewritten as $$H|_{\vec{z}=\vec{p}} = \vec{p} \cdot \vec{p}^H, \quad (21)$$

where the superscript H denotes the Hermitian conjugate of the steering vector.

Equation (21) is a spectral decomposition of the matrix H for the special case of a single sound source in a noiseless environment. In this case, the steering vector is the only eigenvector of H having a non-vanishing eigenvalue, while all other eigenvalues are equal to zero.

When there is background noise, the matrix H will usually have additional non-vanishing matrix elements. However, as long as the background noise remains sufficiently small, the largest eigenvalue of H may still be assumed to be associated with a sound source, i.e., with an object that outputs sound toward the microphone array in a well-defined direction, rather than background noise. In the case of several sound sources, there may be several large eigenvalues.

Reverting to FIG. 7, at 83, the N eigenvalues $$\lambda_1(\vec{z}) \geq \lambda_2(\vec{z}) \geq \ldots \geq \lambda_N(\vec{z}) \quad (22)$$

and the associated eigenvectors $$\vec{v}_1(\vec{z}), \vec{v}_2(\vec{z}), \ldots, \vec{v}_N(\vec{z}) \quad (23)$$

of the matrix H are determined. As H is a Hermitian matrix, all eigenvalues are real-valued, and the eigenvectors form an orthogonal basis. As indicated in Equations (22) and (23), the eigenvalues and eigenvectors of H are dependent, via the matrix H from which they are computed, on the phase factors z(i). The phase factors z(i) are derived by measuring correlations of microphone signal outputs. For brevity of notation, the set of phase factors z(i) has been indicated as a phase factor vector having the phase factors z(i) as vector components.

Figure 8A:
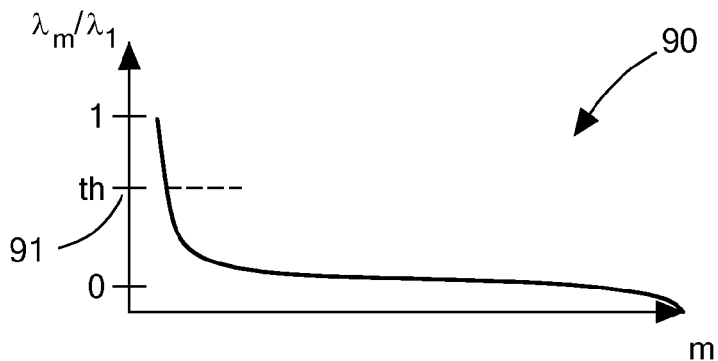
FIG. 8 illustrates exemplary graphs of functions determined in the procedure of FIG. 7.

FIG. 8A is a schematic illustration of an eigenvalue spectrum 90 of an exemplary matrix H. The eigenvalue spectrum has one, or a small number, of large eigenvalues and then shows a pronounced decrease to smaller values. All eigenvalues larger than a predetermined threshold th, indicated at 91, are assigned to a sound source sub-space, while all other eigenvalues are assigned to a noise sub-space.

Assuming that there are $N_0$ eigenvalues larger than the threshold th, the noise sub-space is spanned by the eigenvectors of H having indices N0+1 to N. The matrix V defined as $$V(\vec{z}) = (\vec{v}_{N0+1}(\vec{z}) \vec{v}_{N0+2}(\vec{z}) \ldots \vec{v}_N(\vec{z})), \quad (24)$$

which has the eigenvectors associated with small eigenvalues as matrix columns, is the matrix that projects a vector into the noise sub-space. A steering vector associated with the direction of a sound source is expected to have vanishing, or only small, overlap with the noise sub-space. The length, or L2-norm, of the projection of a steering vector as defined in Equation (18) into the noise sub-space is given by $$g(\vec{z}, \theta) = \vec{p}^H(\theta) \cdot V(\vec{z}) \cdot V^H(\vec{z}) \cdot \vec{p}(\theta)). \quad (25)$$

The function g of Equation (25) depends on the measured phase factors, via the matrix V, and on the angle θ that is a parameter of the steering vector. Therefore, for any set of measured phase factors z(i), g can be evaluated as a function of θ. Minimum values of g, or maximum values of 1/g, can then be identified with the directions of sound sources.

Figure 8B:
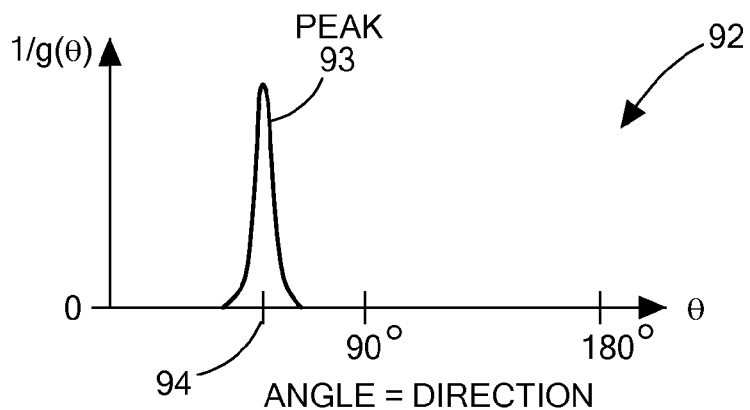
Figure 8C:
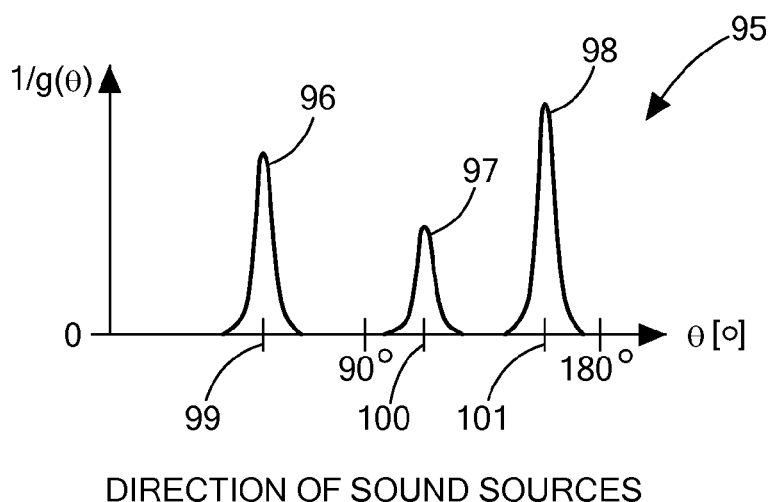

FIGS. 8B and 8C are schematic illustrations 92, 95 of exemplary functions 1/g determined according to Equation (25). In FIG. 8B, there is one pronounced peak 93 in 1/g as a function of the angle of incidence θ. The angle 94, at which 1/g has its maximum, is identified to be the direction in which the sound source is located. In FIG. 8C, there are three pronounced peaks 96-98 in 1/g as a function of the angle of incidence θ. The angles 99-101, at which 1/g has its maxima, are identified to be the directions in which the sound sources are located.

As steps 83-85 of the procedure 80 may be implemented in a manner essentially similar to the conventional frequency-domain MUSIC-algorithm, a more detailed description of these steps may be omitted. It should be noted, however, that contrary to the conventional MUSIC-algorithm, the matrix that is generated to perform steps 83-85 accounts for the variation in microphone distance as a function of frequency band.

In conclusion, methods and devices for locating a sound source are provided. The methods and devices allow the advantages of time delay estimation to be combined with a nested microphone array. In various conceivable fields of application, the linear array of at least three microphones used by the methods and devices according to embodiments of this invention, is already implemented for beamforming or another application, so that no additional microphone components may need to be provided to implement the methods and devices described herein.

Various modifications of the methods and devices described herein may be implemented in other embodiments. For example only, rather than projecting a steering vector into a noise sub-space of a matrix and determining the angle of incidence at which the projection has minimum L2-norm, the steering vector could be projected into a sound source sub-space of the matrix. In this case, the angle of incidence will be determined at which the L2-norm of the projection becomes maximum. In other implementations, it is not required to determine the full eigenspectrum of the matrix generated based on the phase factors. For example, in alternative implementations, only the eigenvectors corresponding to the largest eigenvalues may be determined.

While it is expected that embodiments of the invention may be advantageously utilized in acoustic interfaces, e.g., in hands free telephony applications or for speech control purposes in navigation devices or home entertainment systems, the fields of application are not limited thereto. Rather, embodiments of the invention may be used in any system or application in which it is desirable or required to determine the direction of a sound source.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

We claim:

1. A method of locating a direction of a sound source based on sound received at an array of microphones, comprising:
    determining a correlation function of signals provided by microphones of the array,
    establishing a direction in which the sound source is located based on at least one eigenvector of a matrix having matrix elements which are determined based on the correlation function, and
    wherein the correlation function has a plurality of frequency components associated with a plurality of frequency bands,
    wherein a first frequency component of the plurality of frequency components is determined based on signals from microphones having a first distance, and
    wherein a second frequency component of the plurality of frequency components is determined based on signals from microphones having a second distance, the second distance being different from the first distance.

2. A method according to claim 1, wherein a frequency component of the plurality of frequency components is determined based on signals from a pair of microphones of the array.

3. A method according to claim 1, wherein, in order to determine a frequency component associated with a given frequency band, the pair of microphones is selected from the array to have a given distance which is a function of the given frequency band.

4. Method according to claim 3, wherein the given distance is a decreasing function of the given frequency band.

5. A method according to claim 1, wherein the first frequency component has a first phase factor and the second frequency component has a second phase factor, and at least one of the matrix elements is a non-linear function of the first phase factor or a non-linear function of the second phase factor.

6. A method according to claim 1, wherein the first frequency component has a first phase factor and the second frequency component has a second phase factor, and at least one of the matrix elements is a power of the first phase factor or a power of the second phase factor, having an exponent different from one.

7. A method according to claim 6, wherein an exponent of the power is determined based on a function specifying a microphone distance as a function of frequency band.

8. A method according to claim 1, wherein each frequency component $S(i)$ of the plurality of frequency components has a phase factor $z(i)=S(i)/|S(i)|$, where $0 \leq i \leq N-1$ is an integer frequency band label, and the matrix H has matrix elements $$H_{k,n} = (z(k-n))^{f(k,n)} \text{ for } k \geq n \text{ and}$$

$$H_{k,n} = (z(n-k)^*)^{f(k,n)} \text{ for } k < n,$$

where $0 \leq k, n \leq N-1$, with exponents $f(k,n)$.

9. A method according to claim 8, wherein the exponents $f(k,n)$ are defined so as to account for a variation of microphone distance $d(i)$ as a function of frequency band, wherein microphones are selected to have the distance $d(i)$ to determine the frequency component $S(i)$.

10. Method according to claim 9, wherein $$f(k,n) = \frac{\omega(k) \cdot d(k) - \omega(n) \cdot d(n)}{\text{sign}(k-n) \cdot \omega(|k-n|) \cdot d(|k-n|)} \text{ for } k \neq n,$$

and $$f(k,n) = 1 \text{ for } k = n,$$

where $0 \leq k, n \leq N-1$, and where $\omega(i)$ is a frequency associated with the frequency component $S(i)$ for each frequency band $0 \leq i \leq N-1$.

11. A method according to claim 9, wherein $$f(k,n) = \frac{k \cdot d(k) - n \cdot d(n)}{(k-n) \cdot d(|k-n|)} \text{ for } k \neq n,$$

and $$f(k,n) = 1 \text{ for } k = n,$$

where $0 \leq k, n \leq N-1$.

12. A method according to claim 1, further comprising:
    determining a set of eigenvectors of the matrix and projecting a steering vector into a sub-space spanned by the set of eigenvectors to establish the direction.

13. A method according to claim 12, wherein the set of eigenvectors is associated with eigenvalues of the matrix smaller than a predetermined threshold, and the steering vector is determined such that a projection of the steering vector into the sub-space is minimum.

14. A method according to claim 1, wherein the array of microphones is a nested linear array of microphones.

15. A device for locating a sound source based on sound received at an array of microphones, comprising:
    an input to receive signals provided by the microphones of the array, a direction estimator coupled to the input and configured to establish a direction in which the sound source is located based on at least one eigenvector of a matrix having matrix elements which are determined based on a correlation function of the signals received at the input,
    wherein the direction estimator comprises a processor configured to determine the correlation function, wherein the correlation function has a plurality of frequency components associated with a plurality of frequency bands, and wherein the processor is configured to select a pair of signals from the signals received at the input which originate from a pair of microphones to determine a frequency component associated with a given frequency band, the pair of signals being selected such that the pair of microphones has a distance varying as a function of the given frequency band.

16. A device according to claim 15, further comprising:
    a nested linear array of microphones coupled to the input to provide the signals thereto.

17. A device according to claim 15, further comprising:
    a component for at least one of speech control or speech communication purposes, the component having an input to receive information on a direction of a sound source.

18. A computer program product comprising a non-transitory computer readable medium having computer code thereon for execution on a computer, the computer code for locating a direction of a sound source based on sound received at an array of microphones, the computer code comprising:
    computer code for determining a correlation function of signals provided by microphones of the array, and
    computer code for establishing a direction in which the sound source is located based on at least one eigenvector of a matrix having matrix elements which are determined based on the correlation function,
    wherein the correlation function has a plurality of frequency components associated with a plurality of frequency bands,
    wherein a first frequency component of the plurality of frequency components is determined based on signals from microphones having a first distance, and
    wherein a second frequency component of the plurality of frequency components is determined based on signals from microphones having a second distance, the second distance being different from the first distance.

19. A computer program product according to claim 18, wherein a frequency component of the plurality of frequency components is determined based on signals from a pair of microphones of the array.

20. A computer program product according to claim 18, wherein, in order to determine a frequency component associated with a given frequency band, the pair of microphones is selected from the array to have a given distance which is a function of the given frequency band.

21. A computer program product according to claim 20, wherein the given distance is a decreasing function of the given frequency band.

22. A computer program product according to claim 18, wherein the first frequency component has a first phase factor and the second frequency component has a second phase factor, and at least one of the matrix elements is a non-linear function of the first phase factor or a non-linear function of the second phase factor.

23. A computer program product according to claim 18, wherein the first frequency component has a first phase factor and the second frequency component has a second phase factor, and at least one of the matrix elements is a power of the first phase factor or a power of the second phase factor, having an exponent different from one.

24. A computer program product according to claim 23, wherein an exponent of the power is determined based on a function specifying a microphone distance as a function of frequency band.

25. A computer program product according to claim 18, wherein each frequency component S(i) of the plurality of frequency components has a phase factor z(i)=S(i)/|S(i)|, where $0 \leq i \leq N-1$ is an integer frequency band label, and the matrix H has matrix elements $H_{k,n} = (z(k-n))^{f(k,n)}$ for $k \geq n$ and $H_{k,n} = (z(n-k)^*)^{f(k,n)}$ for $k < n$, where $0 \leq k, n \leq N-1$, with exponents f(k,n).

26. A computer program product according to claim 25, wherein the exponents f(k,n) are defined so as to account for a variation of microphone distance d(i) as a function of frequency band, wherein microphones are selected to have the distance d(i) to determine the frequency component S(i).

27. A computer program product according to claim 26, wherein $$f(k, n) = \frac{\omega(k) \cdot d(k) - \omega(n) \cdot d(n)}{\text{sign}(k-n) \cdot \omega(|k-n|) \cdot d(|k-n|)} \text{ for } k \neq n,$$

and $$f(k, n) = 1 \text{ for } k = n,$$

where $0 \leq k, n \leq N-1$, and where $\omega(i)$ is a frequency associated with the frequency component S(i) for each frequency band $0 \leq i \leq N-1$.

28. A computer program product according to claim 26, wherein $$f(k, n) = \frac{k \cdot d(k) - n \cdot d(n)}{(k-n) \cdot d(|k-n|)} \text{ for } k \neq n,$$

and $$f(k, n) = 1 \text{ for } k = n,$$

where $0 \leq k, n \leq N-1$.

29. A computer program product according to claim 18, further comprising:
    computer code for determining a set of eigenvectors of the matrix and projecting a steering vector into a sub-space spanned by the set of eigenvectors to establish the direction.

30. A computer program product according to claim 29, wherein the set of eigenvectors is associated with eigenvalues of the matrix smaller than a predetermined threshold, and the steering vector is determined such that a projection of the steering vector into the sub-space is minimum.

31. A computer program product according to claim 18, wherein the array of microphones is a nested linear array of microphones.

32. A method of locating a direction of a sound source based on sound received at an array of microphones, comprising:

determining a matrix of correlation functions of the signals received by the array of microphones, the correlation function being associated with a plurality of frequency bands corresponding to the sound source;

determining at least one eigenvector of the matrix based on a function of the microphone distance as a function of the frequency bands; and establishing a direction of sound source based on at least one eigenvector of the matrix.

33. A method according to claim 32, wherein the plurality of frequency components determined from a microphone pair having a different distance between each pair.

* * * * *